May 26, 1959  J. L. STUBBLEFIELD  2,887,835
MARKING MACHINE
Filed Nov. 23, 1953  3 Sheets-Sheet 1
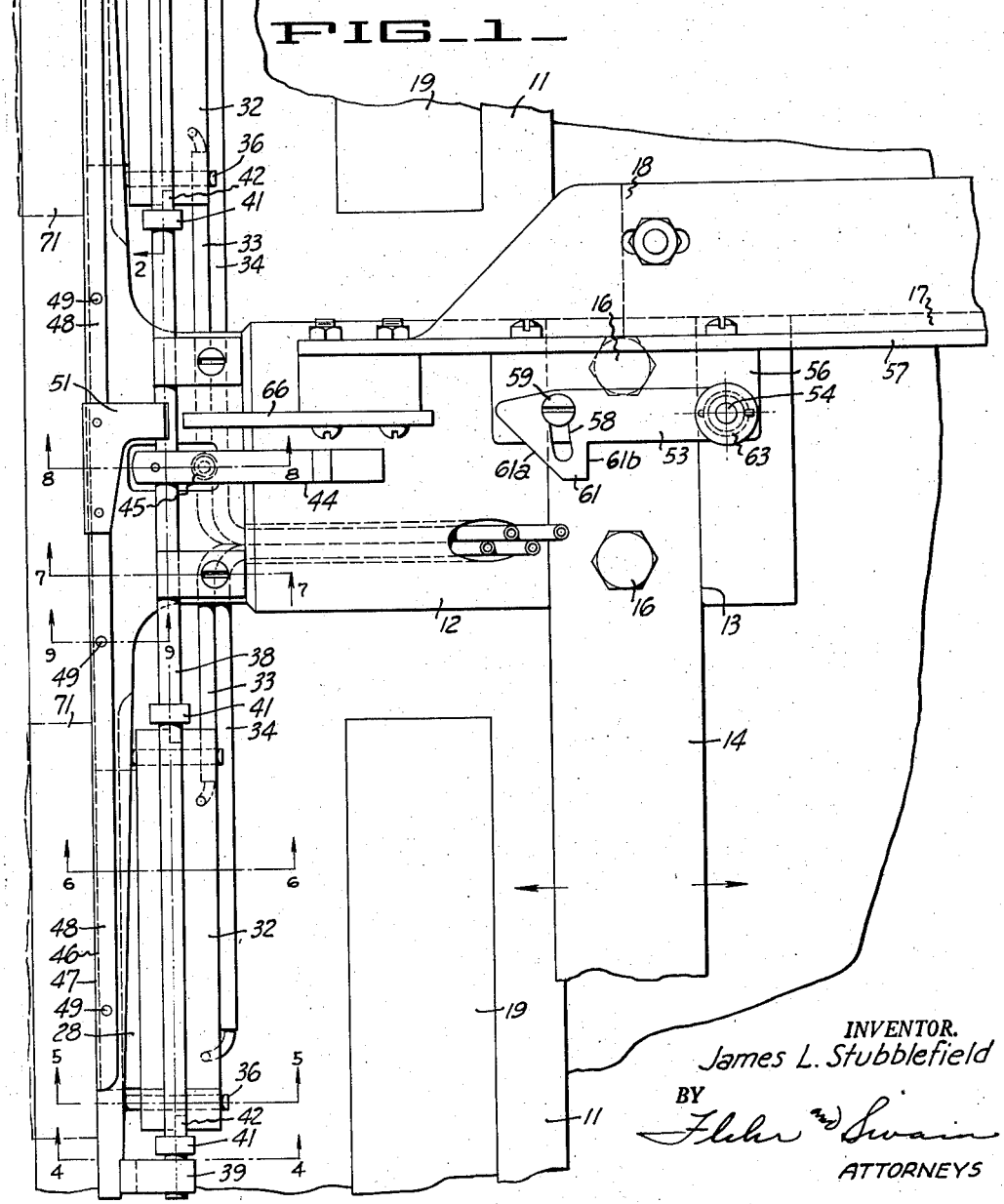
INVENTOR.
James L. Stubblefield
BY
ATTORNEYS

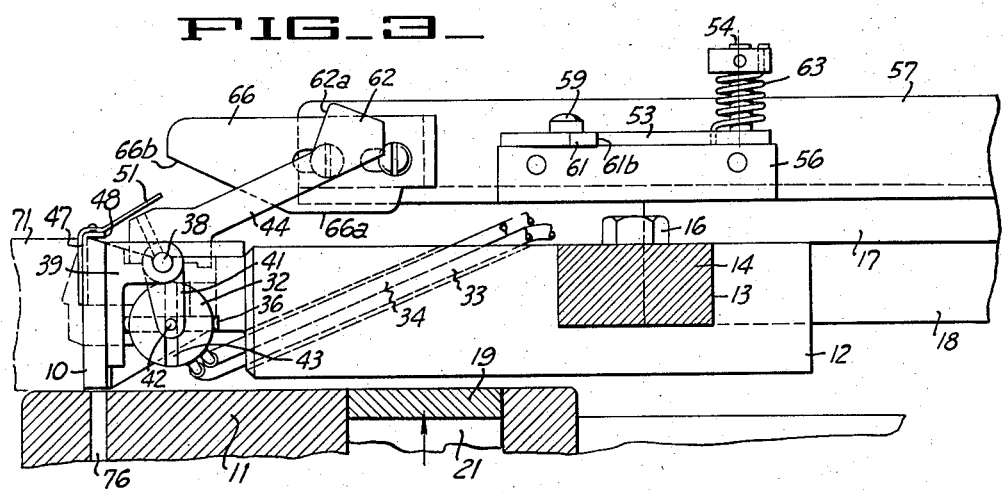

May 26, 1959 — J. L. STUBBLEFIELD — 2,887,835
MARKING MACHINE
Filed Nov. 23, 1953 — 3 Sheets-Sheet 3
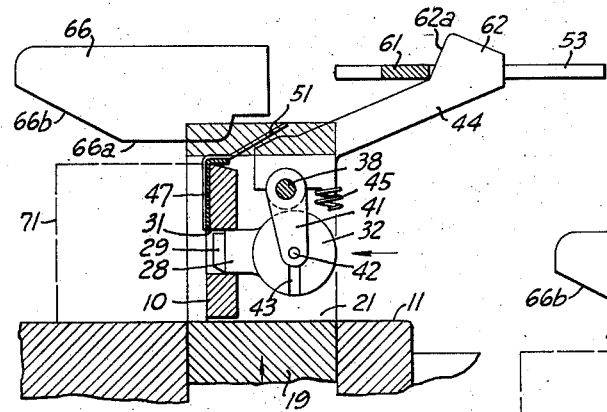
FIG_10_
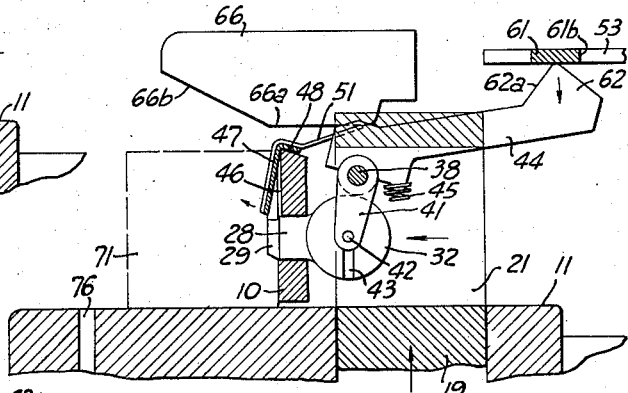
FIG_11_
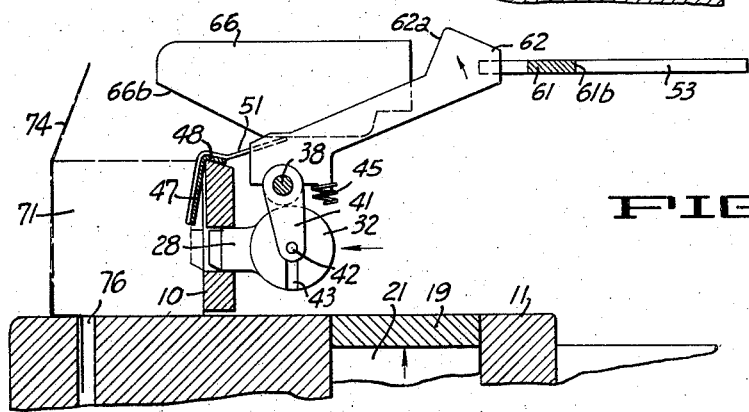
FIG_12_
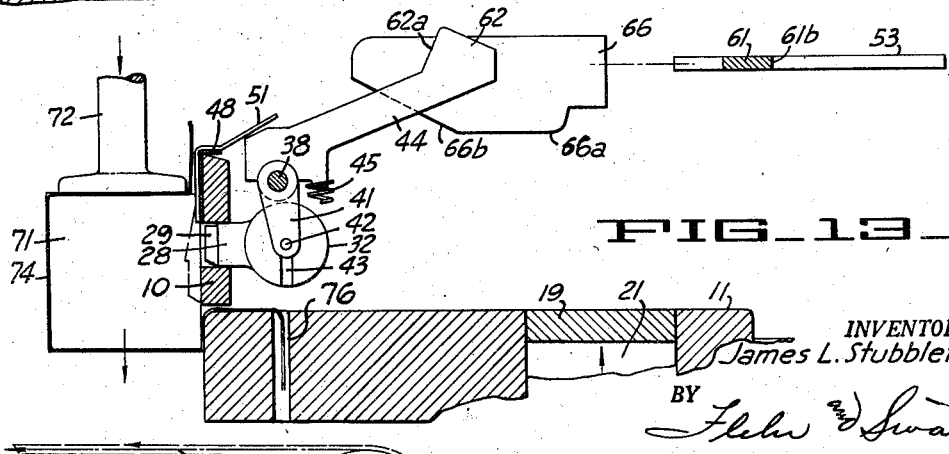
FIG_13_
INVENTOR.
James L. Stubblefield
BY
ATTORNEYS United States Patent Office 2,887,835
Patented May 26, 1959

2,887,835
MARKING MACHINE
James L. Stubblefield, Denison, Tex.
Application November 23, 1953, Serial No. 393,544
4 Claims. (Cl. 53—111)

This invention relates generally to marking devices suitable for use with molding and packaging machines.

In the packaging of relatively soft plastic products such as oleomargarine and butter, it is common practice to use so-called automatic "print" forming machines, which serve to automatically form the material into cubes or "prints" of the desired size, and which in addition may carry out automatic wrapping and cartoning operations. One machine of this type is manufactured by Lynch Corporation, of Toledo, Ohio, under the trade name of "Morpac." In such machines one or more molding devices are provided, together with means for feeding the plastic material into the mold cavity under presure. The molding device is operated to cyclically present a molded form or print to a pusher bar, which in turn is cyclically operated to push the print from the mold cavity, after which the print may be wrapped and packaged either automatically or manually. In many instances, as for example to comply with the laws of certain states, it is desirable and necessary to impress letters or other indicia directly on one side of the print, before the wrapper is applied. It is a primary object of the present invention to provide a practical device by means of which such a mark or impression can be made.

Another object of the invention is to provide a marking device of the above character which can be readily applied to standard machines being used in the industry, as for example the abovementioned Morpac machine.

Another object of the invention is to provide a marking device of the above character which applies a well defined and clean impression on one side of the print, and which provides a vent to facilitate retraction of the die from the print.

Another object of the invention is to provide a device of the above character which after installation upon a standard print forming machine, will serve to carry out all of its operations automatically.

Additional objects and features of the invention will appear from the following description in which the preferred embodiment has been set forth in detail in conjunction with the accompanying drawing.

Referring to the drawing:

Figure 1 is a plan view illustrating a portion of a print forming machine, including particularly the pusher bar, and also illustrating a device incorporating the present invention installed in connection with the pusher bar.

Figure 2 is a cross-sectional detail taken along the line 2—2 of Figure 1.

Figure 3 is a side elevational view of the pusher bar and associated parts.

Figure 4 is a cross-sectional view taken along the line 4—4 of Figure 1.

Figure 5 is a cross-sectional view taken along the line 5—5 of Figure 1.

Figure 6 is a cross-sectional view taken along the line 6—6 of Figure 1.

Figure 7 is a cross-sectional detail taken along the line 7—7 of Fig. 1, and showing parts of the vent forming means.

Figure 8 is a cross-sectional detail taken along the line 8—8 of Figure 1.

Figure 9 is an enlarged detail taken along the line 9—9 of Figure 1.

Figures 10 to 13 inclusive are schematic views, partly in section, serving to illustrate various operating positions of the pusher bar and the associated marking device.

Referring to Figures 1 and 3, I have shown a pusher bar or ram 10 of the type used in machines of the Morpac type. This bar extends horizontally over a table 11, and is connected to power means (not shown) for effecting its reciprocation in a direction perpendicular to the face of the bar. In the present instance the bar is of sufficient length to discharge two prints simultaneously from two molding devices. The main portion of the pusher bar is carried by the head 12, which is in the form of a block having a lateral slot 13. A bar 14, which is a part of the print forming machine, is fitted within the slot 13 and secured thereto by suitable means such as the screws 16. Bars 17 and 18 are stationary parts of the print forming machine, and provide a guideway for the pusher bar head 12.

In conjunction with the table 11 I have shown part of a molding device 19, such as is incorporated in print forming machines of the above type. This molding device is reciprocated vertically, to translate the same from a position in which material like oleomargarine is pressed under pressure into the molding cavity 21, to a position in which the lower side of this molding cavity is contiguous with the top surface of the table 11, at which time movement of the pusher bar from retracted toward projected position causes one end of the bar to pass through the molding cavity, thus expelling the print from the same. In the particular machine illustrated there are two such molding devices, whereby they cyclically present two molded prints to the pusher bar.

Separate stamping or marking means is associated with each end of the pusher bar 10, and in each instance consists of a marking die 28, having raised letters 29 or like indicia formed on the same. The die is loosely accommodated in an opening 31 formed in the pusher bar. Upon the rear side of the pusher bar 10 there is a heater 32 to which the die is secured. While various forms of heaters can be employed, in this instance I have shown a simple metal cylinder which is connected at spaced points to the water circulating tubes 33 and 34. When the machine is in operation hot water is circulated through these tubes and through the cylinder 32, thus maintaining the die 28 at a desired temperature level for optimum operation.

The heater 32 is suitably supported for sliding movements between die marking and retracted positions, by suitable means which in this instance consists of pins 36 that extend horizontally from the rear side of the pusher bar, and which are loosely accommodated within the openings 37 formed in the solid ends of the heater 32.

The means provided for moving the dies between marking and retracted positions includes in this instance a shaft 38 which extends horizontally along the rear side of the pusher bar, and is carried by the journals 39. Fingers 41 are secured to the shaft 38 adjacent the ends of the heaters, and the lower ends of these fingers are provided with pins 42, which slidably engage within the vertical slots 43 formed in the heater ends. Shaft 38 is also secured to an operating arm 44, which is adapted to be moved as will be presently explained to rock the shaft, and which is urged in one direction by the spring 45.

Vent forming means is provided in conjunction with each of the dies. Thus the front face of the pusher bar is provided with a recess 46 to accommodate the metal strip 47. The upper edge of this strip is provided with a flange 48, that is loosely retained with respect to the pusher bar by the pins 49. Rearwardly extending tab 51 is attached to the intermediate portion of the strip 47, and forms an operating arm. It will be noted that the lower edge of the strip 47 extends in proximity with the raised indicia 29 of the marking dies. When the tab 51 is depressed during operation of the machine, the strip 47 is swung to the vent forming position illustrated particularly in Figure 11.

Certain stationary parts cooperate with the arm 44 and the tab 51, to effect the desired automatic operation when the pusher bar is reciprocated during normal operation of the print forming machine. Thus in conjunction with the arm 44, I provide a trip latch 53, which is attached by pivot pin 54 to the supporting bracket 56. This bracket in turn can be carried by a member 57, in this instance in the form of a structural angle, which is attached to a stationary part of the print forming machine. The free end of the trip finger 53 is provided with a slot 58, which accommodates the limiting screw 59. A lug 61 extends from the finger 53 and is adapted to engage the end portion 62 of the arm 44. A torsion spring 63 acts between the pin 54 and the trip finger 53 and urges the trip finger in a counterclockwise direction as viewed in Fig. 1. The forward edge 61a of the lug 61 is sloped as viewed in Figure 1, while the rear edge 61b extends perpendicular to the direction of movement of the pusher bar.

When the pusher bar is being retracted to the limit of its reciprocating movement, the end portion 62 of arm 44 engages the sloped edge 61a of the latch 53, thus causing the latch to be moved to one side against the urge of spring 63. At the extremity of such movement the latch 53 snaps back in front of the end portion 62. When the pusher bar advances the sloped edge 62a engages the edge 61a of latch 53, and as a result the arm 44 is deflected downwardly to rock the shaft 38, thus moving the dies 28 to marking position of the same.

The frame member 57 also serves as a mounting for the stationary strike lug 66. The lower edge portions 66a and 66b of this lug are adapted to be engaged by the end of the tab 51. Thus when the pusher bar is at the end of its reciprocating movement, immediately prior to projecting it forwardly to remove prints from the molding device, the end of tab 51 is to the rear of the edge portion 66a. As the pusher bar moves forwardly, and about the same time as the marking die is being projected, tab 51 is depressed by engagement with the edge portion 66a, and as a result the strip 47 is shifted to the position illustrated in Figures 11 and 12, to form venting recesses extending upwardly from the dies to facilitate removal of the dies by allowing the entrance of air. It was found that this prevented any tendency of the plastic product to adhere to the dies.

Operation of my device is as follows: When installed on a machine the pusher bar is adapted to reciprocate continuously, in synchronism with operation of the molding means. At the rear end of this reciprocating movement, the front face of the pusher bar is adjacent the molding device 19, and at this time the molding device moves upwardly to bring two molded prints to a level even with the top surface of the table 11. The pusher bar now moves forwardly whereby the end portions of the bar pass through the mold cavities to remove the prints, and thereafter the pusher bar continues to move forwardly to translate the prints to wrapping and like operations. In Figure 10 a print 71 is being pushed out of the mold cavity. As it leaves the mold cavity, arm 44 is swung downwardly to rock the shaft 28, whereby the marking dies are projected to force the raised indicia 29 into the print, in the manner illustrated in Figure 11. At about the same time the tab 66 causes the venting strip 47 to be swung to the vent forming position illustrated in Figure 11. As the pusher bar progresses forwardly, arm 44 is released to permit the shaft 38 to return to its initial position, thereby retracting the marking die to the position shown in Figure 12. Further movement of the pusher bar causes the tab 51 to be disengaged with respect to lug 66, and eventually translates the print 71 to the discharge position illustrated in Figure 13. Here the prints are engaged by the reciprocating pusher 72, which forces the prints downwardly to suitable receiving means, such as the conveyor 73.

During its movement to a position beneath the plunger 72, the print may be engaged with a paper or parchment wrapper 74. This wrapper may be disposed in a vertical plane and in the path of movement of the prints, by suitable means (not shown) such as is incorporated in machines of the Morpac type. The table is shown provided with a slot 76, whereby such a wrapper can be accommodated. During the final downward movement of the print 71, the vent strip 47 is retracted within its accommodating recess, although it leaves a venting recess in the side of the print. The pusher bar is then returned to its initial position, for the next operation.

It will be evident from the foregoing that I have provided a relatively simple device which can be installed on prevailing types of print forming machines, to provide a desired marking on one side of the prints, in conjunction with normal automatic operation of the machine. The impression formed by the die is clean and legible, which is attributed in part to the action of the venting means.

I claim:

1. A marking device for a machine of the type in which material of plastic consistency is shaped in a mold and the mold cyclically presented to a reciprocating pusher bar for discharge of the molded form from the same, the marking device comprising a marking die, the die being accommodated within an opening formed in the pusher bar, pins carried by the pusher bar, a heater slidably carried on said pins, said heater adapted to carry water and being attached to said die for conjoint movements relative to the pusher bar, a shaft journaled on the pusher bar, means serving to connect the shaft to the heater whereby upon rocking the shaft the heater and the die are moved relative to the pusher bar between marking and retracted positions, means for circulating hot water through said heater and means for effecting movements of said heater and die relative to the pusher bar between said positions, in synchronism with reciprocation of the bar.

2. A marking device as in claim 1 together with vent forming means movably carried by the pusher bar, and means for effecting operation of said vent forming means in synchronism with reciprocation of the pusher bar.

3. A marking device as in claim 2 in which the vent forming means comprises a member extending from the indicia of the marking die to one edge of the pusher bar, said member being movable between vent forming and retracted positions, and means for moving said member to said vent forming position substantially in synchronism with movements of the die to said marking position.

4. A marking device for a machine of the type in which a material of plastic consistency is shaped in a mold and a mold cyclically presented to a reciprocating pusher bar for discharge of the molded print from the same, the marking device comprising a marking die, the die being accommodated within an opening formed in the pusher bar, pins carried by the pusher bar, a heater slidably carried on said pins, said heater being attached to said die for conjoint movement relative to said pusher bar, a shaft journalled on the pusher bar, means serving to connect the shaft to the heater whereby upon rocking the shaft the heater and the die are moved relative to the pusher bar between marking and retracted positions, vent forming means carried by the pusher bar, said vent forming means consisting of a member movably mounted on said pusher bar end extending from the indicia of the marking die to one edge of the pusher bar, and common actuating means for effecting movement of said heater and die relative to the pusher bar between said positions in synchronism with the reciprocation of the pusher bar and for moving said vent forming member between a vent forming position and a retracted position substantially in synchronism with movement of the marking die.

References Cited in the file of this patent

UNITED STATES PATENTS

| | | |
|---|---|---|
| 886,936 | Brock | May 5, 1908 |
| 1,055,049 | Keys | Mar. 4, 1913 |
| 1,129,111 | Moss | Feb. 23, 1915 |
| 1,292,850 | Moss | Jan. 28, 1919 |
| 1,522,545 | Ratliff | Jan. 13, 1925 |
| 1,545,513 | Peters | July 14, 1925 |
| 1,583,022 | Stanley | May 4, 1926 |
| 2,182,656 | Bruggimann | Dec. 5, 1939 |
| 2,186,914 | Shurley | Jan. 9, 1940 |
| 2,350,853 | Wheeler | June 6, 1944 |
| 2,356,951 | Runton | Aug. 29, 1944 |
| 2,592,793 | Coon | Apr. 15, 1952 |
| 2,722,038 | Freund | Nov. 1, 1955 |